Dec. 9, 1958　　R. H. B. BUTEUX ET AL　　2,863,172
APPARATUS FOR PRODUCTION OF FILMS
Filed July 27, 1954
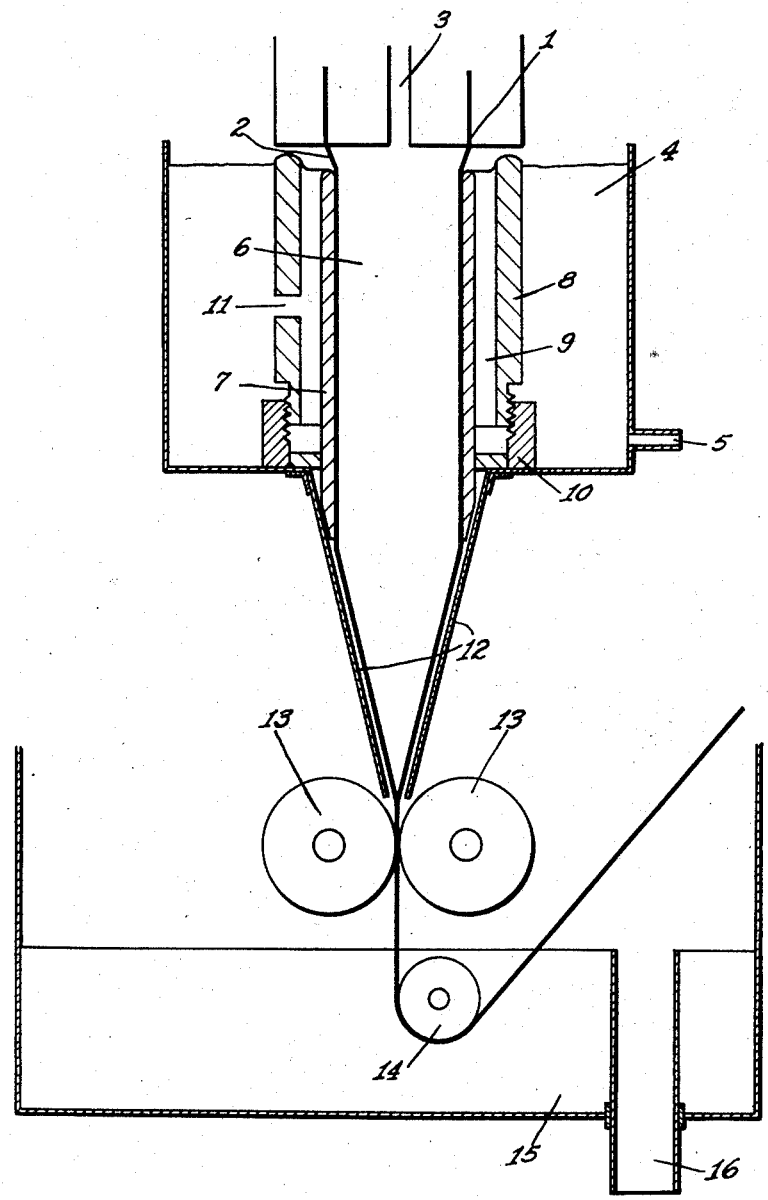
INVENTORS:
Richard Harold Barclay Buteux,
Jack Witherington Cornforth,
BY Cushman, Darby & Cushman
ATTORNEYS.

United States Patent Office 2,863,172
Patented Dec. 9, 1958

2,863,172

APPARATUS FOR PRODUCTION OF FILMS

Richard Harold Barclay Buteux, Welwyn Garden City, and Jack Witherington Cornforth, Harpenden, England, assignors to Imperial Chemical Industries Limited, London, England, a corporation of Great Britain Application July 27, 1954, Serial No. 446,124

Claims priority, application Great Britain July 31, 1953

1 Claim. (Cl. 18—14)

This invention relates to the manufacture of thin walled tubing or of tubular or flat film from organic thermoplastic materials. It relates particularly to apparatus for continuously extruding a molten organic thermoplastic material through an annular die, downwardly withdrawing the tubing so formed while maintaining a volume of gas within the tubing, the volume of gas and the rate of withdrawing the tubing from the die being such as to bring about a reduction in wall thickness of the tubing, and, after cooling, collapsing the tubular film so produced by means of pinch rolls.

In this apparatus for the manufacture of tubular film from thermoplastic materials having high melting points and giving mobile melts it is desirable to provide means to chill the inflated film as quickly as possible so that the length of the bubble formed and maintained therein between the extrusion die and the collapsing rollers may be kept to a minimum. The bubble may then be easily held in alignment with the extrusion die, and the film may be uniformly inflated.

It has previously been proposed to produce film by a modification of the apparatus hereinbefore described, wherein the inflated tubular film is passed into a cooling liquid in which the pinch rolls are immersed. We have found, however, that when air or another gas is used as the inflating medium for a material having a high melting point and giving a very mobile melt, for example the linear superpolyamides and linear superpolyesters such as polyethylene terephthalate, the internal pressure required to inflate the film, even when a substantial increase in diameter of the tubing is produced, is so low that if the inflated film is passed into a bath of water it is collapsed by the pressure of the water before the molten material has cooled sufficiently to prevent the opposed surfaces of the collapsed film from sticking together.

It has also been proposed to quench extruded articles such as fibres, films, tubes and coatings of organic thermoplastic materials by passing them downwardly into a downwardly flowing continuous body of quenching liquid.

In accordance with the present invention, an apparatus for the production of thin walled tubing or tubular film by continuously extruding molten organic thermoplastic material in tubular form and continuously withdrawing the tubing downwardly in a substantially vertical direction from the extruder while maintaining within the tubing a volume of gas such that the degree of inflation and the rate of withdrawing the tubing bring about a reduction in thickness of the tubing, is characterised in that the inflated tubing is passed through a passageway which, at least at the entrance end for the tubing, is of substantially circular cross section, and which is interiorly bathed by a downwardly flowing cooling liquid which contacts the whole of the external surface of the tubing or tubular film as it passes through the passageway.

The cooling liquid is preferably supplied continuously from a body of liquid which surrounds and may chill the outer surface of the wall of said passageway. Additional cooling may be supplied by the circulation of a coolant, such as mains water or a refrigerant, through the wall of the passageway which then must be a hollow wall or must be suitably bored; this is desirable, for example, when relatively thick film is being produced.

In a preferred form of this invention, the circumference of the passageway from the point where the inflated tubing first contacts the cooling liquid is slightly greater than that of the inflated tubing; more precisely, this circumference is preferably greater than that of the inflated tubing by an amount which compensates for the thickness of the layer of liquid flowing down the walls of the passageway. The tubing is thus brought uniformly into contact with the cooling liquid all over its surface, and wrinkling of the film is prevented. The circumference of the passageway may be equal to or greater or smaller than the circumference of the extrusion orifice.

The volume of gas is generally most conveniently held within the tubing by collapsing the film by means of a pair of nip rollers (which also have the function of drawing the tubing from the extruder) after it has emerged from the passageway. However, the tubing may be slit longitudinally at one or more points before it is passed through the nip rolls, provided that precautions are taken to prevent a reduction of pressure inside the film; this may be done, for example, by immersing the nip rollers in water, and slitting the film below the surface of the water. One or more lengths of flat film or sheet are obtained this way.

The apparatus of the present invention is shown diagrammatically in transverse vertical section in the accompanying drawing, in which 1 is an annular die orifice through which molten thermoplastic material is extruded in the form of tube 2, which is drawn vertically down from the die and is inflated by air supplied through the inlet 3. 4 is a bath of cold water which is supplied through inlet 5, the bath being provided with a central passageway 6 into which the film passes immediately after leaving the extrusion orifice. This passageway is of circular cross section, bounded by a wall 7, which is lower than the outer wall of the bath. A second circular wall 8 surrounds the inner wall to leave a narrow annular space 9 for example of 0.25 inch, between the two walls. This outer wall is intended to act as a barrier to the ripples which may form in the main tank 4 during the extrusion; such ripples would produce irregularities in the film if they were allowed to travel to the surface of the tubing. This outer wall is adjustable in height by means of a coarse thread which fits into a threaded collar 10; this wall also contains a number of half-inch diameter holes 11 to allow flow of water from the bath into the annular space. The wall 8 is kept above the water level in 4 but below the outer wall of the bath. A pair of flat plates 12 are hinged to the bottom of the bath 4 and can be brought together centrally by means of a screw and nut not shown. These plates may be highly polished metal, etched metal or metal coated with polytetrafluoroethylene; they produce a change in the cross section of the film, changing it from circular to approximately the shape of an ellipse of decreasing minor axis. The film, having passed down between the plates is then taken through a pair of nip rolls 13, one of which is preferably rubber coated and driven at a speed adjusted, in accordance with the rate of extrusion and the amount of inflation of the film, to give film of the desired thickness. The flattened tubular film then passes over another roll or rolls 14 which may or may not be driven; in this way the direction of the film is changed so that it may be taken out of the bath 15 (to which are attached the bearings for rolls 13 and 14). This bath 15 contains an outlet 16, the height of which is adjustable, and if desired may be filled to any depth with water. It is not necessary, however, for this bath to contain any liquid apart from that flowing down with the film, unless the film is to be slit under water, as hereinbefore described, before it reaches the nip rolls.

The wall 7 may be hollow or suitably bored for the circulation of a coolant therethrough. Various other modifications may be made in the apparatus and its operation particularly described. For example: the cooling water may be replaced by any other liquid which has a boiling point not greatly below that of water, and which has no undesirable effect on the film; the air pressure and haul-off speed may be such as to give a final tube diameter that is equal to or greater than the diameter of the extruded tube, instead of smaller as shown in the drawing; and the two inclined plates 12, shown in the drawing may be replaced by two converging series of rollers or bars.

In one particular example the apparatus of this invention as described and as illustrated in the accompanying drawings, was used in the following manner:

Polyethylene terephthalate of approximately 10,000 average molecular weight was extruded at a temperature of 285° C. through an annular die of 3 inches outside diameter and 2.984 inches inside diameter, and was quenched by passage through a circular passageway of diameter slightly less than 3 inches, placed just below the die mouth. Air pressure inside the tubing was adjusted to 0.25 inch water. The outer wall 3, shown in the diagram was adjusted to be 0.25 inch above the wall of the passageway 6. The rate of flow of water over the wall was adjusted to be sufficient to quench the molten polyethylene terephthalate when the extruder was running at about 50 lb./hr. output in conjunction with a haul-off speed of 40 feet per minute. The tube produced under these conditions had a diameter of 2.75 inches and a wall thickness of 3 one-thousandths.

We claim:

Apparatus for the production of thin walled tubing and tubular film that comprises an extruder adapted to extrude molten organic thermoplastic material through an annular orifice, means for drawing the tubing so extruded downwardly in a substantially vertical direction from the extruder, means for introducing and maintaining a volume of gas within the tubing, means forming a passageway for cooling the tubing and situated between said annular orifice and said drawing means, said last-named means being defined by a first annular wall, means including a second annular wall disposed outwardly of said first wall and defining therewith an annular reservoir for cooling liquid, said second wall being of greater height than said first wall thus providing that cooling liquid retained by said second wall will flow over said first wall and down through said passageway, and an intermediate annular wall of greater height than said first wall and provided between said first and second walls, said intermediate wall defining an annular space with said first wall, and means located below the top of said first wall for establishing communication between said annular space and the rest of said reservoir.

References Cited in the file of this patent
UNITED STATES PATENTS

| | | |
|---|---|---|
| 1,740,029 | Moomy | Dec. 17, 1929 |
| 2,324,397 | Hull | July 13, 1943 |
| 2,423,260 | Slaughter | July 1, 1947 |
| 2,545,300 | Nixon | Mar. 13, 1951 |
| 2,634,459 | Irons | Apr. 14, 1953 |
| 2,641,022 | Kress | June 9, 1953 |